(12) United States Patent
Ra

(10) Patent No.: US 12,509,107 B2
(45) Date of Patent: Dec. 30, 2025

(54) APPARATUS FOR CONTROLLING VEHICLE AND METHOD THEREOF

(71) Applicants: Hyundai Motor Company, Seoul (KR); Kia Corporation, Seoul (KR)

(72) Inventor: Ju Hyeok Ra, Guri-Si (KR)

( * ) Notice: Subject to any disclaimer, the term of this patent is extended or adjusted under 35 U.S.C. 154(b) by 103 days.

(21) Appl. No.: 18/648,721

(22) Filed: Apr. 29, 2024

(65) Prior Publication Data

US 2025/0091599 A1 Mar. 20, 2025

(30) Foreign Application Priority Data

Sep. 20, 2023 (KR) .......................... 10-2023-0125736

(51) Int. Cl.
*B60W 50/14* (2020.01)
*G01S 17/88* (2006.01)

(52) U.S. Cl.
CPC ............. *B60W 50/14* (2013.01); *G01S 17/88* (2013.01); *B60W 2420/408* (2024.01); *B60W 2520/10* (2013.01); *B60W 2520/14* (2013.01); *B60W 2552/53* (2020.02); *B60W 2554/20* (2020.02); *B60W 2554/801* (2020.02); *B60W 2554/802* (2020.02)

(58) Field of Classification Search
CPC ........ B60W 50/14; G01S 17/88; G06V 20/56; G06V 20/58; G06T 7/11; G06T 7/187; G06T 7/20; G06T 7/246; G06T 7/62; G06T 7/73; A63F 13/42; A63F 13/56; A63F 13/57; A63F 13/803; G06K 9/00; G06K 9/00798; G06K 9/00818
See application file for complete search history.

(56) References Cited

U.S. PATENT DOCUMENTS

| | | | |
|---|---|---|---|
| 2015/0063648 A1* | 3/2015 | Minemura | G06F 18/21 382/104 |
| 2019/0272435 A1* | 9/2019 | Kundu | G06V 20/588 |
| 2024/0325933 A1* | 10/2024 | Xue | A63F 13/803 |

* cited by examiner

*Primary Examiner* — Van T Trieu
(74) *Attorney, Agent, or Firm* — Banner & Witcoff, Ltd.

(57) ABSTRACT

The present disclosure may relate to a vehicle control apparatus and a method. The vehicle control apparatus may determine virtual boxes for external vehicles between the first and second virtual boxes, determine a vehicle's lane from divided lanes using a virtual box location or tracking histograms, adjust virtual boxes or heading directions of a virtual box based on the vehicle's lane or adjacent vehicles, and signal the adjustments.

20 Claims, 9 Drawing Sheets

APPARATUS FOR CONTROLLING VEHICLE AND METHOD THEREOF

CROSS-REFERENCE TO RELATED APPLICATION

This application claims the benefit of priority to Korean Patent Application No. 10-2023-0125736, filed in the Korean Intellectual Property Office on Sep. 20, 2023, the entire contents of which are incorporated herein by reference.

TECHNICAL FIELD

The present disclosure relates to an apparatus for controlling a vehicle and a method thereof, and more specifically, relates to a technology for identifying an external object by using a sensor (e.g., light detection and ranging (LiDAR) sensor).

BACKGROUND

Various studies are being conducted to identify an external object by using various sensors to assist a vehicle in driving.

In particular, while the vehicle is driving in a driving assistance device activation mode or an autonomous driving mode, the external object may be identified by using a sensor (e.g., LiDAR).

There is a need to accurately identify a driving direction of an external object or the type of the external object through the LiDAR. Moreover, to accurately identify the driving direction of the external object, there is a need to accurately identify a heading direction of a virtual box corresponding to the external object.

SUMMARY

According to the present disclosure, an apparatus may comprise a sensor and a processor, wherein the processor is configured to determine, based on sensing information obtained by the sensor, virtual boxes corresponding to external vehicles in a region included between a first virtual box and a second virtual box based on determining that the first virtual box and the second virtual box respectively correspond to road edges, determine a first lane, where a vehicle is driving, among a plurality of lanes divided by a plurality of grids, wherein the first lane is determined based on at least one of a lateral location of at least one virtual box among the virtual boxes or histograms generated by tracking the virtual boxes respectively corresponding to the external vehicles, merge virtual boxes corresponding to a first external vehicle or a second external vehicle, or change a heading direction of a virtual box corresponding to the first external vehicle or the second external vehicle, based on determining at least one of the first external vehicle driving on the first lane where the vehicle is driving or the second external vehicle driving on a second lane adjacent to the first lane where the vehicle is driving, and output a signal indicating the merged virtual boxes or the changed heading direction of the virtual box.

The apparatus, wherein the processor is configured to determine the first lane, where the vehicle is driving, based on the lateral location of the at least one virtual box among the virtual boxes and a longitudinal distance between the vehicle and one of the virtual boxes being smaller than or equal to a first reference distance, and wherein the longitudinal distance is a shortest longitudinal distance among a plurality of longitudinal distances, wherein each of the plurality of longitudinal distances is a longitudinal distance between a straight line parallel to or corresponding to a front surface of the vehicle and one of points included in the one of the virtual boxes.

The apparatus, wherein the processor is configured to determine the first lane, where the vehicle is driving, based on the histograms generated by tracking the virtual boxes and a longitudinal distance between the vehicle and one of the virtual boxes exceeding a first reference distance, and wherein the longitudinal distance is a shortest longitudinal distance among a plurality of longitudinal distances, wherein each of the plurality of longitudinal distances is a longitudinal distance between a straight line parallel to or corresponding to a front surface of the vehicle and one of points included in the one of the virtual boxes.

The apparatus, wherein the processor is configured to determine the lateral location of the at least one virtual box among the virtual boxes based on the vehicle driving at a speed in a first range and at least one of a yaw rate of the vehicle or an inter-axis distance between front and rear axles of the vehicle.

The apparatus, wherein the processor is configured to determine the lateral location of the at least one virtual box among the virtual boxes based on the vehicle driving at a speed in a second range and a yaw rate of the vehicle.

The apparatus, wherein the processor is configured to determine at least one of the first external vehicle or the second external vehicle and merge a third virtual box corresponding to the first external vehicle or the second external vehicle and a fourth virtual box detected within a designated distance from the third virtual box based on the first external vehicle or the second external vehicle being a leading vehicle of the vehicle or a pre-leading vehicle, the first external vehicle or the second external vehicle being in a moving state, a longitudinal distance between the vehicle and the first external vehicle or the second external vehicle being within a designated section, and a height of the first external vehicle or the second external vehicle being greater than or equal to a first reference height, and wherein the longitudinal distance, between the first external vehicle and the vehicle or between the second external vehicle and the vehicle, is a shortest longitudinal distance among a plurality of longitudinal distances, wherein each of the plurality of longitudinal distances is a longitudinal distance between a straight line parallel to or corresponding to a front surface of the vehicle and one of points included in the third virtual box or the fourth virtual box.

The apparatus, wherein the processor is configured to select at least one of the first external vehicle or the second external vehicle and change a heading direction of a virtual box corresponding to the first external vehicle or the second external vehicle based on the first external vehicle or the second external vehicle being a leading vehicle of the vehicle, the first external vehicle or the second external vehicle being in a moving state, and a height of the first external vehicle or the second external vehicle being greater than or equal to a second reference height.

The apparatus, wherein the processor is configured to determine a first heading direction of the vehicle and a second heading direction of the first external vehicle or the second external vehicle and change the second heading direction by using an average of heading directions of the first external vehicle or the second external vehicle determined during frames of a designated section based on a difference between the first heading direction and the second heading direction being smaller than or equal to a reference angle.

The apparatus, wherein the processor is configured to output information indicating that at least one the external vehicles is driving in a lane where a bush object or a road edge is detected.

The apparatus, wherein the processor is configured to sequentially assign an identifier associated with a longitudinal distance to a respective virtual box, based on a distances, wherein each of the plurality of longitudinal plurality of longitudinal distances is a longitudinal distance between the vehicle and the respective virtual box of the virtual boxes, and wherein the longitudinal distance between the vehicle and the respective virtual box is a shortest longitudinal distance between a straight line parallel to or corresponding to a front surface of the vehicle and one of points included in the respective virtual box.

According to the present disclosure, a method performed by a processor, the method may comprise determining, based on sensing information obtained by the sensor, virtual boxes corresponding to external vehicles in a region included between a first virtual box and a second virtual box based on determining that the first virtual box and the second virtual box respectively correspond to road edges; determining a first lane where a vehicle is driving, among a plurality of lanes divided by a plurality of grids, wherein the first lane is determined based on at least one of a lateral location of at least one virtual box among the virtual boxes, or histograms generated by tracking the virtual boxes respectively corresponding to the external vehicles; merging virtual boxes corresponding to a first external vehicle or a second external vehicle, or change a heading direction of a virtual box corresponding to the first external vehicle or the second external vehicle, based on determining at least one of the first external vehicle driving on the first lane where the vehicle is driving, or the second external vehicle driving on a second lane adjacent to the first lane where the vehicle is driving; and output a signal indicating the merged virtual boxes or the changed heading direction of the virtual box.

The method may further comprise determining the first lane, where the vehicle is driving, based on the lateral location of the at least one virtual box among the virtual boxes and a longitudinal distance between the vehicle and one of the virtual boxes being smaller than or equal to a first reference distance, and wherein the longitudinal distance is a shortest longitudinal distance among a plurality of longitudinal distances, wherein each of the longitudinal distances is a longitudinal distance between a straight line parallel to or corresponding to a front surface of the vehicle and one of points included in the one of the virtual boxes.

The method may further comprise determining the first lane, where the vehicle is driving, based on the histograms generated by tracking the virtual boxes and a longitudinal distance between the vehicle and one of the virtual boxes reference and wherein the exceeding a first distance, longitudinal distance is a shortest longitudinal distance among a plurality of longitudinal distances, wherein each of the plurality of longitudinal distances is a longitudinal distance between a straight line parallel to or corresponding to a front surface of the vehicle and one of points included in the one of the virtual boxes.

The method may further comprise determining the lateral location of the at least one virtual box among the virtual boxes based on the vehicle driving at a speed in a first range and at least one of a yaw rate of the vehicle, or an inter-axis distance between front and rear axles of the vehicle.

The method may further comprise determining the lateral location of the at least one virtual box among the virtual boxes based on the vehicle driving at a speed in a second range and a yaw rate of the vehicle.

The method may further comprise determining at least one of the first external vehicle or the second external vehicle; and merging a third virtual box corresponding to the first external vehicle or the second external vehicle and a fourth virtual box detected within a designated distance from the third virtual box based on the first external vehicle or the second external vehicle being a leading vehicle of the vehicle, or a pre-leading vehicle, the first external vehicle or the second external vehicle being in a moving state, a longitudinal distance between the vehicle and the first external vehicle or the second external vehicle being within a designated section, a height of the first external vehicle or the second external vehicle being greater than or equal to a first reference height, and wherein the longitudinal distance, between the first external vehicle and the vehicle or between the second external vehicle and the vehicle, is a shortest longitudinal distance among a plurality of longitudinal distances, wherein each of the plurality of longitudinal distances is a longitudinal distance between a straight line parallel to or corresponding to a front surface of the vehicle and one of points included in the third virtual box or the fourth virtual box.

The method may further comprise selecting at least one of the first external vehicle or the second external vehicle; and changing a heading direction of a virtual box corresponding to the first external vehicle or the second external vehicle based on the first external vehicle or the second external vehicle being a leading vehicle of the vehicle, the first external vehicle or the second external vehicle being in a moving state, and a height of the first external vehicle or the second external vehicle being greater than or equal to a second reference height.

The method may further comprise determining a first heading direction of the vehicle; and a second heading direction of the first external vehicle or the second external vehicle; and changing the second heading direction by using an average of heading directions of the first external vehicle or the second external vehicle determined during frames of a designated section based on a difference between the first heading direction and the second heading direction being smaller than or equal to a reference angle.

The method may further comprise outputting information indicating that at least one of the external vehicles is driving in a lane where a bush object or a road edge is detected.

The method may further comprise sequentially assigning an identifier associated with a longitudinal distance to a respective virtual box, based on a plurality of longitudinal distances, wherein each of the plurality of longitudinal distances is a longitudinal distance between the vehicle and the respective virtual box of the virtual boxes, and wherein the longitudinal distance between the vehicle and the respective virtual box is a shortest longitudinal distance between a straight line parallel to or corresponding to a front surface of the vehicle and one of points included in the respective virtual box.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
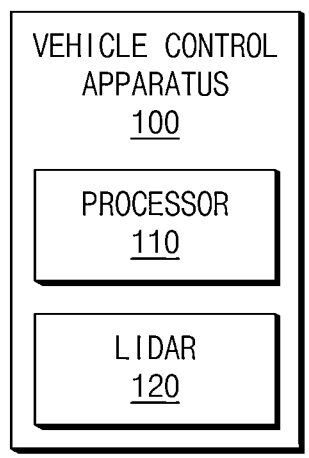
FIG. 1 shows an example of a block diagram of a vehicle control apparatus, according to an example of the present disclosure.

Hereinafter, some examples of the present disclosure will be described in detail with reference to the accompanying drawings. In adding reference numerals to components of each drawing, it should be noted that the same components have the same reference numerals, although they are indicated on another drawing. Furthermore, in describing the examples of the present disclosure, detailed descriptions associated with well-known functions or configurations will be omitted when they may make subject matters of the present disclosure unnecessarily obscure.

In describing elements of an example of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various examples of the present disclosure will be described in detail with reference to FIGS. 1 to 9.

FIG. 1 shows an example of a block diagram of a vehicle control apparatus, according to an example of the present disclosure.

Referring to FIG. 1, a vehicle control apparatus 100 according to an example of the present disclosure may be implemented inside or outside a vehicle, and some of components included in the vehicle control apparatus 100 be may implemented inside or outside the vehicle. At this time, the vehicle control apparatus 100 may be integrated with internal control units of a vehicle and may be implemented with a separate device so as to be connected to control units of the vehicle by means of a separate connection means. For example, the vehicle control apparatus 100 may further include components not shown in FIG. 1.

Referring to FIG. 1, a vehicle control apparatus 100 according to an example may include a processor 110 and a LiDAR 120. The processor 110 or the LiDAR 120 may be electrically and/or operably coupled with each other by an electronic component including a communication bus.

Hereinafter, the fact that pieces of hardware are coupled operably may include the fact that a direct and/or indirect connection between the pieces of hardware is established by wired and/or wirelessly such that second hardware is controlled by first hardware among the pieces of hardware. Although different blocks are shown, an example is not limited thereto.

Some of the pieces of hardware in FIG. 1 may be included in a single integrated circuit including a system on a chip (SoC). The type and/or number of hardware included in the vehicle control apparatus 100 is not limited to that shown in FIG. 1. For example, the vehicle control apparatus 100 may include only some of the pieces of hardware shown in FIG. 1.

The vehicle control apparatus 100 according to an example may include hardware for processing data based on one or more instructions. The hardware for processing data may include an arithmetic and logic unit (ALU), a floating point unit (FPU), a field programmable gate array (FPGA), a central processing unit (CPU), and/or an application processor (AP). The processor 110 may have a structure of a single-core processor, or may have a structure of a multi-core processor including a dual core, a quad core, a hexa core, or an octa core.

The LiDAR 120 of the vehicle control apparatus 100 according to an example may obtain data sets from identifying objects surrounding the vehicle control apparatus 100. For example, the LiDAR 120 may identify at least one of a location of the surrounding object, a movement direction of the surrounding object, or a speed of the surrounding object, or any combination thereof based on a pulse laser signal emitted from the LiDAR 120 being reflected by the surrounding object and returned.

For example, the LiDAR 120 may obtain data sets including a plurality of points in the space defined by a first axis, a second axis, and a third axis based on a pulse laser signal reflected from surrounding objects. For example, the LiDAR 120 may obtain data sets including a plurality of points in the space, which is formed by the first axis, the second axis, and the third axis, based on receiving the pulse laser signal at a designated period.

For example, the first axis may include an x-axis. For example, the second axis may include a y-axis. For example, the third axis may include a z-axis. The first axis, the second axis, and/or the third axis are not limited to the above examples.

The processor 110 included in the vehicle control apparatus 100 according to an example may emit light from a vehicle by using the LiDAR 120. For example, the processor 110 may receive light emitted from the vehicle. For example, the processor 110 may identify at least one of a location, a speed, or a moving direction, or any combination thereof of a surrounding object based on a time required to transmit light emitted from the vehicle and/or a time required to receive light emitted from the vehicle.

The processor 110 may obtain data sets including a plurality of points based on the time required to transmit light emitted from the vehicle and the time required to receive light emitted from the vehicle. The processor 110 may obtain data sets for expressing a plurality of points in a three-dimensional virtual coordinate system including the first axis, the second axis, and the third axis.

The processor 110 of the vehicle control apparatus 100 according to an example may identify a first virtual box and a second virtual box respectively corresponding to road edges (e.g., side areas of a road including a private land, vegetation, or utility poles, emergency stops, a boundary limiting a road surface designated for vehicles, curb line, road bank, roadside strip, embankment edge, shoulder line, edge of pavement, etc.) through the LiDAR 120. For example, the processor 110 may identify virtual boxes corresponding to external vehicles in a region included between the first virtual box and the second virtual box based on identifying the first virtual box and the second virtual box respectively corresponding to the road edges. For example, the first virtual box may include a virtual box corresponding to a road edge located in a left direction of the vehicle. For example, the second virtual box may include a virtual box corresponding to a road edge located in a right direction of the vehicle. However, the first virtual box and the second virtual box are not limited to the above examples. For example, the first virtual box may include a virtual box corresponding to a road edge located in the right direction of the vehicle, and the second virtual box may include a virtual box corresponding to a road edge located in the left direction of the vehicle.

The processor 110 of the vehicle control apparatus 100 according to an example may identify virtual boxes corresponding to external vehicles in a region included between the first virtual box and the second virtual box. The processor 110 may identify a first lane, on which the vehicle is driving, from among a plurality of lanes divided by a plurality of grids based on at least one of a lateral location of at least one virtual box among virtual boxes identified in the region included between the first virtual box and the second virtual box, or histograms generated by tracking virtual boxes respectively corresponding to external vehicles, or any combination thereof. For example, the plurality of lanes divided by a plurality of grids may be identified based on a plurality of regions divided by a first axis direction among the first axis, the second axis, and the third axis.

For example, the processor 110 may track virtual boxes respectively corresponding to external vehicles during a plurality of frames. The processor 110 may obtain histograms based on tracking virtual boxes respectively corresponding to external vehicles during the plurality of frames. For example, the processor 110 may identify a lane, on which the vehicle including the vehicle control apparatus 100 is driving, based on the histograms obtained by virtual boxes identified during the plurality of frames.

In an example, the processor 110 may identify at least one of a first external vehicle driving on a first lane where the vehicle is driving, or a second external vehicle driving on a second lane adjacent to the first lane on which the vehicle is driving, or any combination thereof. For example, the first lane may include a lane on which the vehicle is driving. For example, the second lane may include a lane adjacent to the first lane on which the vehicle is driving. For example, the second lane may include a lane located to a left side of the first lane and/or a lane located to a right side of the first lane.

In an example, on the basis of identifying at least one of the first external vehicle, or the second external vehicle, or any combination thereof, the processor 110 may merge virtual boxes corresponding to the first external vehicle or the second external vehicle, or may change a heading direction of a virtual box corresponding to the first external vehicle or the second external vehicle.

For example, on the basis of at least one of the type of the first external vehicle, or the type of the second external vehicle, or any combination thereof being identified as a designated type, the processor 110 may merge the virtual boxes corresponding to the first external vehicle or the second external vehicle, or may change the heading direction of the virtual box corresponding to the first external vehicle or the second external vehicle.

For example, the designated type may include a type related to a specialty vehicle. For example, the type related to the specialty vehicle may include at least one of a heavy truck, or a truck connected to a trailer, or any combination thereof. For example, the type related to the specialty vehicle may include types excluding at least one of a passenger vehicle, or a sports utility vehicle (SUV), or any combination thereof.

For example, the designated type may include a type corresponding to an unknown vehicle.

In an example, the processor 110 may identify a longitudinal distance between the vehicle and each of virtual boxes corresponding to external vehicles. For example, the longitudinal distance between the vehicle and each of the virtual boxes may include a first straight line parallel to or corresponding to a front surface of the vehicle, and the closest distance to the first straight line from points included in the virtual boxes corresponding to the external vehicles.

For example, the processor 110 may identify the longitudinal distance between the vehicle and each of the virtual boxes on a plane formed by the first axis and the second axis among the first axis, the second axis, and the third axis.

In an example, the longitudinal distance between the vehicle and each of the virtual boxes is smaller than or equal to a first reference distance. For example, if the longitudinal distance between the vehicle and each of the virtual boxes is smaller than or equal to the first reference distance, the processor 110 may identify a lateral location of at least one virtual box among the virtual boxes. If the longitudinal distance between the vehicle and each of the virtual boxes is smaller than or equal to the first reference distance, the processor 110 may identify a first lane, on which the vehicle is driving, based on the lateral location of the at least one virtual box among the virtual boxes.

In an example, if the longitudinal distance between the vehicle and each of the virtual boxes exceeds a first reference distance, the processor 110 may identify the first lane, on which the vehicle is driving, based on histograms generated by tracking the virtual boxes respectively corresponding to external vehicles.

In an example, the processor 110 may identify the speed of the vehicle. The processor 110 may identify that the vehicle is driving at a speed in a first range. If the vehicle is driving at the speed in the first range, the processor 110 may identify the lateral location of the at least one virtual box among the virtual boxes based on at least one of a speed of the vehicle, a yaw rate of the vehicle, or an inter-axis distance between front and rear axles of the vehicle, or any combination thereof. The identifying of the lateral location of at least one virtual box among virtual boxes is described later with reference to FIG. 3.

In an example, if the vehicle is driving at the speed in the first range, the processor 110 may identify the lateral location of the at least one virtual box among the virtual boxes based on at least one of a speed of the vehicle, or a yaw rate of the vehicle, or any combination thereof. For example, a maximum value of the first range may be the same as a minimum value of a second range. For example, the maximum value of the first range may include the minimum value of the second range.

In an example, the processor 110 may identify a first external vehicle on a first lane. The processor 110 may identify a second external vehicle on a second lane adjacent to the first lane. The processor 110 may identify that the first external vehicle or the second external vehicle is a leading vehicle of the vehicle or a vehicle (hereinafter, referred to as a "pre-leading vehicle") placed in front of the leading vehicle. For example, the leading vehicle of the vehicle or the pre-leading vehicle may include a vehicle identified in front of the vehicle.

The processor 110 may identify that the first external vehicle or the second external vehicle is driving in a positive direction of the first axis among the first axis, the second axis, and the third axis. The processor 110 may determine whether the longitudinal distance between the vehicle and the first external vehicle or the second external vehicle is within a designated section. The processor 110 may identify a height of the first external vehicle or the second external vehicle. For example, the processor 110 may identify the height of the first external vehicle or the second external vehicle based on points identified in the third axis among the first axis, the second axis, and the third axis. The processor 110 may determine whether the height of the first external vehicle or the second external vehicle is greater than or equal to the first reference height.

In an example, the processor 110 may identify at least one of the first external vehicle, or the second external vehicle, or any combination thereof and may merge a third virtual box corresponding to the first external vehicle or the second external vehicle with a fourth virtual box identified within the designated distance from the third virtual box based on the fact that the first external vehicle or the second external vehicle is identified as a leading vehicle of the vehicle or a pre-leading vehicle, a first external vehicle or a second external vehicle is driving in a positive direction of the first axis among the first axis, the second axis, and the third axis, a longitudinal distance between the vehicle and the first external vehicle or the second external vehicle is identified as being within a designated section, and a height of the first external vehicle or the second external vehicle is greater than or equal to a first reference height. For example, the processor 110 may generate a merge box based on merging the third virtual box and the fourth virtual box. For example, the merge box may correspond to at least one of the first external vehicle, or the second external vehicle, or any combination thereof.

In an example, the processor 110 may identify at least one of the first external vehicle, or the second external vehicle, or any combination thereof and may change a heading direction of a virtual box corresponding to an external vehicle based on the fact that the first external vehicle or the second external vehicle is a leading vehicle of the vehicle, the first external vehicle or the second external vehicle is identified as moving in a positive direction of the first axis among the first axis, the second axis, and the third axis, and the height of the first external vehicle is greater than or equal to a second reference height. For example, the second reference height may be smaller than or equal to the first reference height.

In an example, the processor 110 may identify a first heading direction of the vehicle. The processor 110 may identify a second heading direction of the first external vehicle or the second external vehicle. The processor 110 may identify the first heading direction of the vehicle and the second heading direction of the first external vehicle or the second external vehicle.

The processor 110 may identify a difference between the first heading direction and the second heading direction. On the basis of identifying that a difference between the first heading direction and the second heading direction is smaller than or equal to a reference angle, the processor 110 may change the second heading direction of the virtual box corresponding to the first external vehicle or the second external vehicle by using an average of heading directions of the first external vehicle or the second external vehicle identified during frames of the designated section.

For example, the processor 110 may change the second heading direction of the second virtual box to an average of the heading directions of the first external vehicle or the second external vehicle identified during the frames of the designated section.

In an example, the processor 110 may identify a bush object (e.g., bushes, trees, vegetations, plants, gardens, bush-like structures, flowers, etc.) or road edge (e.g., a boundary or limit of a roadway where it meets a shoulder, ditch, or adjacent lane) on a lane where at least one external vehicle among the external vehicles is driving. For example, the bush object may include an object to which an identifier indicating a bush object is assigned. For example, the bush object may include an irregular array of a plurality of points.

In an example, the processor 110 may sequentially assign identifiers according to the longitudinal distance to virtual boxes corresponding to external vehicles based on the longitudinal distance between the vehicle and each of the virtual boxes. For example, the processor 110 may assign identifiers to virtual boxes in descending order of longitudinal distances between the vehicle and each of the virtual boxes.

The processor 110 may identify the order of external vehicles corresponding to virtual boxes by using an identifier identified based on the longitudinal distance between the vehicle and each of the virtual boxes. For example, on the basis of identifying at least one of a virtual box having an identifier indicating a leading vehicle, or a virtual box having an identifier indicating the pre-leading vehicle, or any combination thereof, the processor 110 may change the heading direction of at least one of a virtual box having the identifier indicating a leading vehicle, or a virtual box having the identifier indicating a pre-leading vehicle, or any combination thereof, or may merge a virtual box identified within a designated distance with at least one of the virtual box having the identifier indicating a leading vehicle, or the virtual box having the identifier indicating a pre-leading vehicle, or any combination thereof.

As described above, the processor 110 of the vehicle control apparatus 100 according to an example may change the heading direction of at least one of the virtual box having the identifier indicating a leading vehicle, or the virtual box having the identifier indicating a pre-leading vehicle, or any combination thereof, or may merge the virtual box identified within a designated distance with at least one of the virtual box having the identifier indicating a leading vehicle, or the virtual box having the identifier indicating a pre-leading vehicle, or any combination thereof, thereby providing assistance in stabilizing a vehicle control system associated with the vehicle control apparatus 100.

Figure 2:
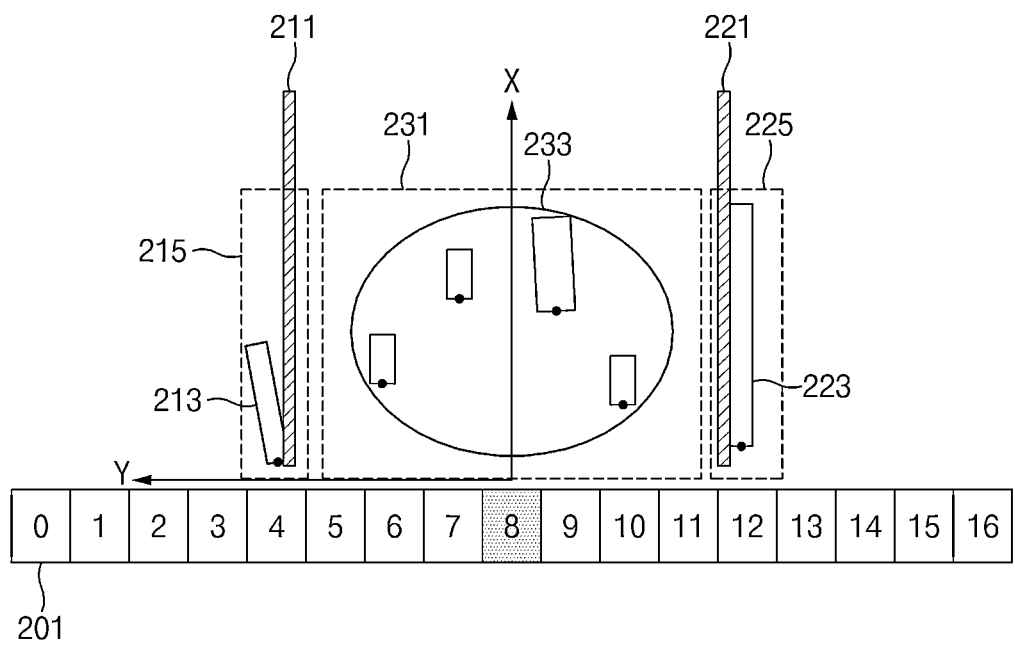
FIG. 2 shows an example of identifying virtual boxes obtained through a LiDAR, in an example of the present disclosure.

FIG. 2 shows an example of identifying virtual boxes obtained through a LIDAR, in an example of the present disclosure.

Referring to FIG. 2, a processor of a vehicle control apparatus according to an example may identify virtual boxes 213 and 223 corresponding to road edges 211 and 221 in a region divided by a plurality of grids 201.

In an example, the processor may identify road edge lanes 215 and 225 including the road edges 211 and 221. For example, the processor may identify the road edge lanes 215 and 225 based on identifying the virtual boxes 213 and 223 corresponding to the road edges 211 and 221 in regions divided by the plurality of grids 201.

For example, the processor may store pieces of information for tracking a virtual box 233 in a memory based on identifying virtual boxes 233, which exclude external objects identified as having a designated height (e.g., approximately 4 m) or higher, and which are placed in front of a vehicle.

For example, the processor may sequentially store pieces of information for tracking the virtual boxes 233, which exclude external objects identified as having the designated height (e.g., approximately 4 m) or higher and which are placed in front of the vehicle, in the memory based on a longitudinal distance between the vehicle and each of the virtual boxes 233.

In an example, the processor may identify the virtual boxes 233 corresponding to external vehicles in a region 231 between the virtual boxes 213 and 223 corresponding to the road edges 211 and 221.

In an example, the processor may identify the road edge lanes 215 and 225 based on a reference point included in the virtual boxes 213 and 223 corresponding to the road edges 211 and 221. For example, the reference point may include a lower center point of each of the virtual boxes 213 and 223 respectively corresponding to the road edges 211 and 221. For example, the lower center point may include a center point of a line segment (e.g., a second axis or y-axis) indicating a width of each of the virtual boxes 213 and 223.

In an example, the processor may identify the region 231, in which at least one of a vehicle, or external vehicles, or any combination thereof is capable of driving, based on identifying the road edge lanes 215 and 225. On the basis of the virtual boxes 233 identified in the region 231 in which a vehicle is capable of driving, the processor may change the heading direction of a leading vehicle of the vehicle or a pre-leading vehicle of the vehicle, or may merge virtual boxes corresponding to the leading vehicle of the vehicle, or virtual boxes corresponding to the pre-leading vehicle of the vehicle.

As described above, the processor of the vehicle control apparatus according to an example may change the heading direction of the leading vehicle of the vehicle or the pre-leading vehicle of the vehicle, or may merge virtual boxes corresponding to the leading vehicle of the vehicle, or virtual boxes corresponding to the pre-leading vehicle of the vehicle, thereby providing assistance such that a vehicle control system related to the vehicle control apparatus is capable of running stably.

Figure 3:
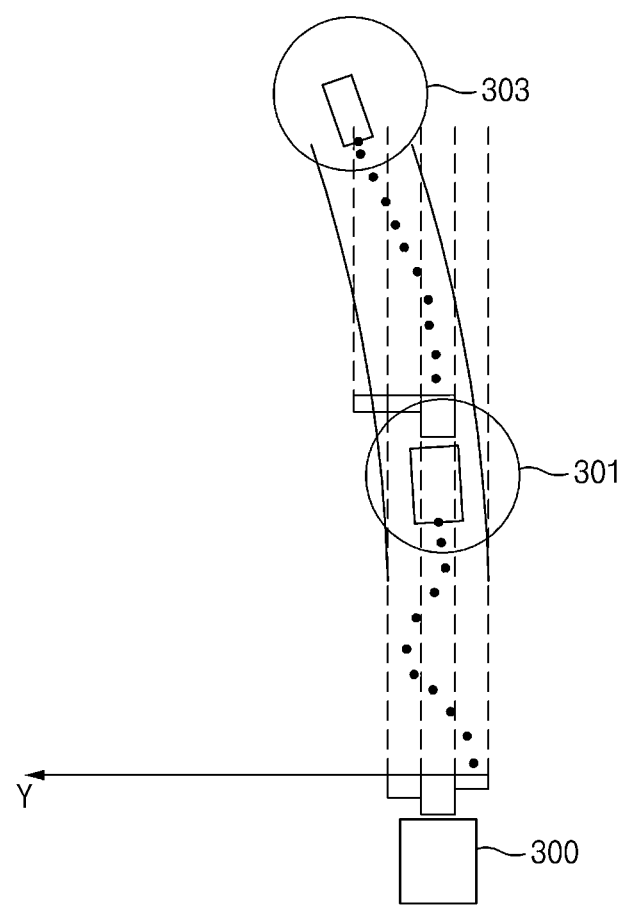
FIG. 3 shows an example of identifying a lateral location of a virtual box, in an example of the present disclosure.

FIG. 3 shows an example of identifying or determining a lateral location of a virtual box, in an example of the present disclosure.

Referring to FIG. 3, a processor of a vehicle control apparatus according to an example may determine virtual boxes 301 and 303 corresponding to external objects (e.g., vehicles driving in front of a vehicle 300). In an example, the processor may identify a distance between the vehicle 300 and each of the virtual boxes 301 and 303. For example, the processor may determine whether distances between the vehicle 300 and each of the virtual boxes 301 and 303 are smaller than or equal to a designated distance (e.g., approximately 5 to 10 m). On the basis of the fact that the distances between the vehicle 300 and each of the virtual boxes 301 and 303 are smaller than or equal to the designated distance, the processor may identify information related to at least one of a lane where the vehicle is driving, or a lane where external vehicles corresponding to the virtual boxes 301 and 303 are driving, or any combination thereof based on a lateral location of each of the virtual boxes 301 and 303.

For example, the processor may identify histograms generated by points, which are obtained by tracking each of the virtual boxes 301 and 303, based on identifying the virtual boxes 301 and 303 corresponding to external vehicles placed beyond a designated distance. For example, the processor may identify at least one of the lane on which the vehicle is driving, or the lane on which external vehicles corresponding to the virtual boxes 301 and 303 are driving, or any combination thereof based on histograms generated by tracking each of the virtual boxes 301 and 303 during frames (e.g., approximately 20 frames) of the designated section.

For example, the processor may generate histograms based on tracking reference points included in the virtual boxes 301 and 303. For example, the reference points included in the virtual boxes 301 and 303 may include points indicating a rear surface of each of the external vehicles.

In an example, the processor may identify a lateral location of each of the virtual boxes 301 and 303 corresponding to external vehicles by using equations below.

$$V_{lat} \cong V * \tan(\delta) \qquad \text{[Equation 1]}$$

For example, in Equation 1, V may include a speed of the vehicle 300. In Equation 1, $\delta$ may include a steering angle of the vehicle 300. The processor may obtain $V_{lat}$ indicating a lateral speed of the vehicle 300 based on the speed of the vehicle 300 and the steering angle of the vehicle 300.

$$\varphi_{slow} = \frac{V * \tan(\delta)}{L} \cong \frac{V_{lat}}{L} \qquad \text{[Equation 2]}$$

For example, in Equation 2, L may include the inter-axis distance of the vehicle 300. For example, the inter-axis distance may include a distance between front and rear wheel axes of the vehicle 300. The processor may obtain $\varphi_{slow}$ indicating a yaw rate at a low speed based on the speed of the vehicle 300, the steering angle of the vehicle 300, or the inter-axis distance of the vehicle 300.

$$\overline{\varphi} = ((1 - \alpha) * \varphi_{slow}) + (\alpha * \varphi) \qquad \text{[Equation 3]}$$

For example, in Equation 3, $\alpha$ may be an engineer coefficient and may include a constant between 0 and 1. For example, in Equation 3, $\varphi_{slow}$ may include a value obtained by using Equation 2. For example, in Equation 3, $\varphi$ may include a yaw rate of the vehicle 300. The processor may obtain $\overline{\varphi}$ indicating an average of yaw rates by using the yaw rate of the vehicle 300 and the yaw rate at a low speed.

$$\text{Radius} = \frac{V}{\overline{\varphi}} \qquad \text{[Equation 4]}$$

In an example, the processor may obtain the radius of curvature by using Equation 4. For example, in Equation 4, V may include a speed of the vehicle 300. For example, the processor may obtain Radius indicating the radius of curvature based on $\overline{\varphi}$ obtained by using Equation 3 and the speed of the vehicle 300.

In an example, the processor may obtain the radius of curvature by using Equation 5 below if the vehicle 300 is driven at a speed exceeding a first range. For example, the speed exceeding the first range may be included in a second range. For example, the processor may obtain the radius of curvature by using Equation 5 if the vehicle 300 is driving at a high speed.

$$\text{Radius} = \frac{V}{\varphi} \qquad \text{[Equation 5]}$$

For example, in Equation 5, V may include the speed of the vehicle 300. For example, in Equation 5, φ may include the yaw rate of the vehicle 300. For example, the processor may obtain the radius of curvature at a high speed based on the speed of the vehicle 300 and the yaw rate of the vehicle 300.

As described above, the processor may obtain the radius of curvature of the vehicle 300 by using at least one of Equation 4, or Equation 5, or any combination thereof.

The processor may identify a direction, in which the virtual boxes 301 and 303 are located relative to the vehicle 300, based on the radius of curvature of the vehicle 300.

For example, if the radius of curvature of the vehicle 300 obtained by using at least one of Equation 4, or Equation 5, or any combination thereof is a positive number, the processor may identify a lateral location of each of the virtual boxes 301 and 303 based on the radius of curvature of the vehicle 300 by using Equation 6.

$$R_{lat} = -\text{Radius} + \sqrt{(\text{Radius} + y)^2 + x^2} \qquad \text{[Equation 6]}$$

For example, when the radius of curvature of the vehicle 300 obtained by using at least one of Equation 4, or Equation 5, or any combination thereof is a negative number, the processor may identify a lateral location of each of the virtual boxes 301 and 303 based on the radius of curvature of the vehicle 300 by using Equation 7.

$$R_{lat} = -\text{Radius} - \sqrt{(\text{Radius} + y)^2 + x^2} \qquad \text{[Equation 7]}$$

For example, in Equation 6 and Equation 7, x and y may include the x-coordinate and y-coordinate of reference points of the virtual boxes 301 and 303, respectively. For example, $R_{lat}$ obtained from Equation 6 and Equation 7 may include a distance at which the virtual boxes 301 and 303 are spaced from a movement route of the vehicle 300. In an example, the processor may identify a lateral location of each of the virtual boxes 301 and 303 based on $R_{lat}$ obtained by using Equation 7.

In an example, the processor may identify at least one of a lane on which the vehicle is driving, or a lane on which external vehicles corresponding to the virtual boxes 301 and 303 are driving, or any combination thereof based on a lateral location of each of the virtual boxes 301 and 303.

As described above, the processor of the vehicle control apparatus according to an example may accurately identify the lane on which the vehicle is driving, or the lane on which external vehicles corresponding to the virtual boxes 301 and 303 are driving, by identifying at least one of the lane on which the vehicle is driving, or the lane on which external vehicles corresponding to the virtual boxes 301 and 303 are driving, or any combination thereof based on a lateral location of each of the virtual boxes 301 and 303.

Figure 4:
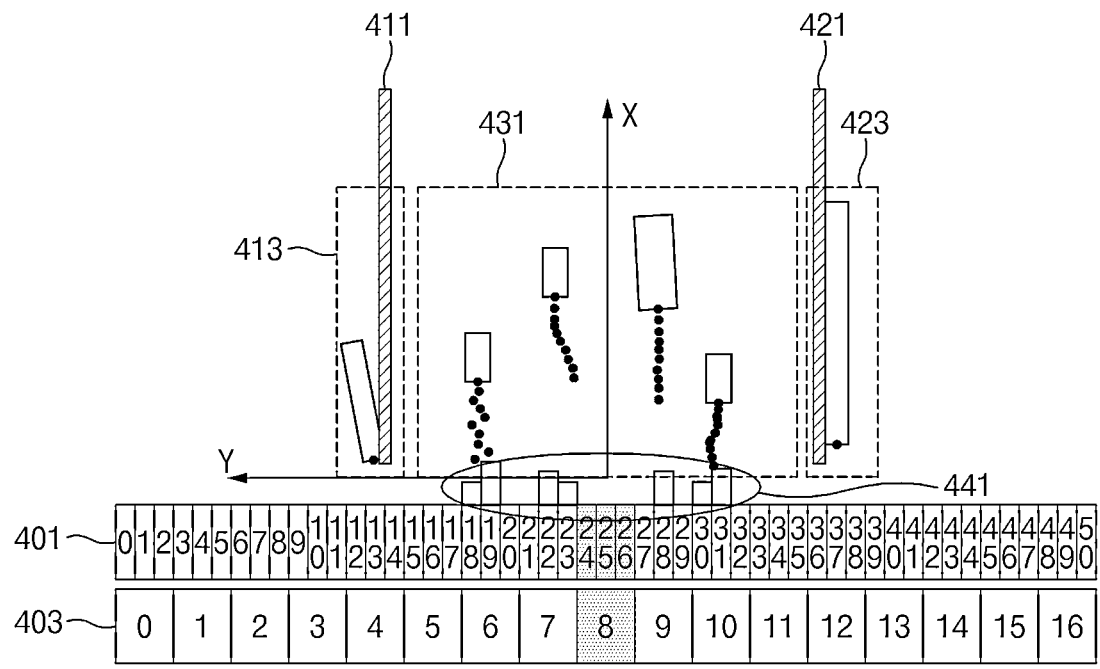
FIG. 4 shows an example of identifying a lane on which a virtual box is located, in an example of the present disclosure.

FIG. 4 shows an example of identifying a lane on which a virtual box is located, in an example of the present disclosure.

Referring to FIG. 4, a processor of a vehicle control apparatus according to an example may identify lanes divided by a plurality of grids 403. The processor may identify partial grids 401 obtained by dividing the plurality of grids 403 at a designated interval.

The processor may identify regions 413 and 423 where road edges 411 and 421 (e.g., side areas of a road including a private land, vegetation, or utility poles, emergency stops, a boundary limiting a road surface designated for vehicles, curb line, road bank, roadside strip, embankment edge, shoulder line, edge of pavement, etc.) are detected. For example, the regions 413 and 423, where the road edges 411 and 421 are identified, may include regions, which are identified as road edge lanes, from among lanes divided by the plurality of grids 403. For example, the processor may assign an identifier indicating a road edge lane to the regions 413 and 423, in which the road edges 411 and 421 are identified, from among the lanes divided by the plurality of grids 403.

In an example, the processor may identify virtual boxes in a region 431 between the road edges 411 and 421. For example, the region 431 between the road edges 411 and 421 may include a region in which at least one of a vehicle, or external vehicles, or any combination thereof is capable of driving.

In an example, the processor may identify virtual boxes corresponding to the external vehicles in the region 431 between the road edges 411 and 421. The processor may track virtual boxes respectively corresponding to the external vehicles. For example, the processor 110 may obtain histograms 441 based on tracking the virtual boxes respectively corresponding to the external vehicles during frames of a designated section.

For example, the processor 110 may obtain the histograms 441 corresponding to the external vehicles based on tracking the virtual boxes respectively corresponding to the external vehicles.

For example, the processor may identify at least one of a lane on which the vehicle is driving, or a lane on which the external vehicles corresponding to the virtual boxes are driving, or any combination thereof based on obtaining the histograms 441.

As described above, the processor of the vehicle control apparatus according to an example may accurately identify the lane on which the vehicle is driving, or the lane on which external vehicles corresponding to the virtual boxes are driving, by identifying at least one of the lane on which the vehicle is driving, or the lane on which external vehicles corresponding to the virtual boxes are driving, or any combination thereof based on the histograms 441.

Figure 5:
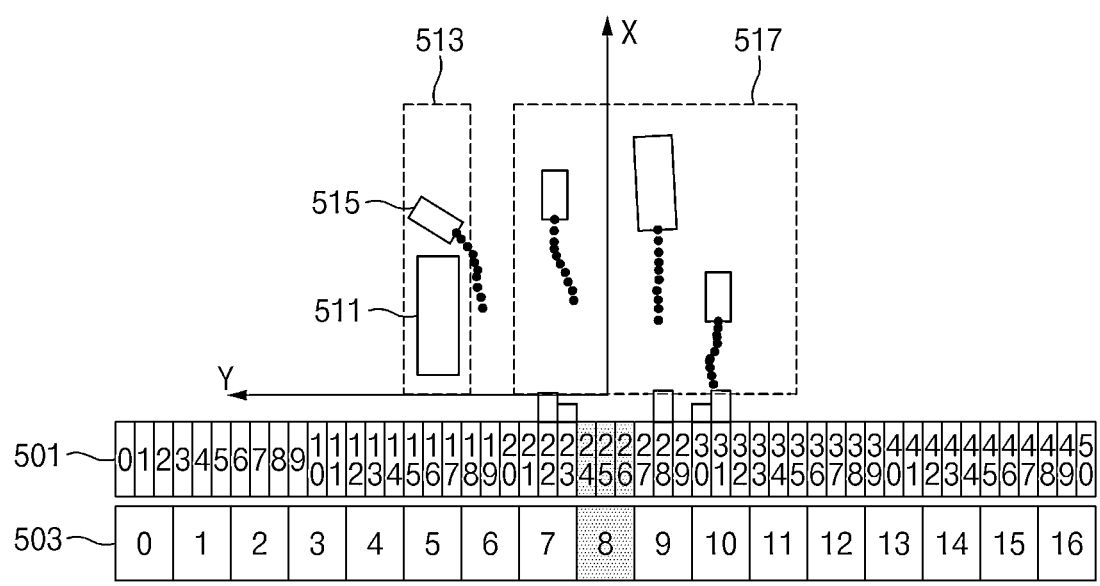
FIG. 5 shows an example of identifying a lane on which a virtual box is located, in an example of the present disclosure.

FIG. 5 shows an example of identifying a lane on which a virtual box is located, in an example of the present disclosure.

Referring to FIG. 5, a processor of a vehicle control apparatus according to an example may identify a region 517 in which at least one of a vehicle, or an external vehicle, or any combination thereof is capable of driving. For example, the processor may identify the region 517, in which at least one of the vehicle, or the external vehicle, or any combination thereof is capable of driving, based on a histogram generated based on a plurality of grids 503 and partial grids 501 obtained by dividing the plurality of grids 503 at a designated interval.

For example, the processor may identify a virtual box 511 corresponding to a bush object (e.g., bushes, trees, vegetations, plants, gardens, bush-like structures, flowers, etc.) or a road edge (e.g., side areas of a road including a private land, vegetation, or utility poles, emergency stops, a boundary limiting a road surface designated for vehicles, curb line, road bank, roadside strip, embankment edge, shoulder line, edge of pavement, etc.). The processor may identify that a region, in which the virtual box 511 corresponding to a bush object or road edge is identified, is a region 513, in which the vehicle or the external vehicle is incapable of driving, from among regions divided by the plurality of grids 503.

For example, the processor may determine whether the virtual box 511, of which a length among a width and the length is smaller than or equal to a first reference length (e.g., about 5-10 m), is present in the region 513 where the vehicle or the external vehicle is incapable of driving. The processor may determine whether the virtual box 511, of which at least one of the width, or the length, or any combination thereof is greater than or equal to a second reference length (e.g., approximately 1-3 m) is present in the region 513 where the vehicle or the external vehicle is incapable of driving.

In an example, the processor may identify a virtual box 515 corresponding to an external vehicle in the region 513 where the vehicle or the external vehicle is incapable of driving. The processor may output a signal (or information) indicating that the virtual box 515 corresponding to the external vehicle is identified the region 513, in which the vehicle or the external vehicle is incapable of driving, based on identifying the virtual box 515 corresponding to the external vehicle in the region 513 where the vehicle or the external vehicle is incapable of driving.

The processor may indicate that a lane on which the virtual box 515 is identified is within a ramp section, by outputting a signal (or information) indicating that the virtual box 515 corresponding to the external vehicle is identified in the region 513 where the vehicle or the external vehicle is incapable of driving.

Figure 6:
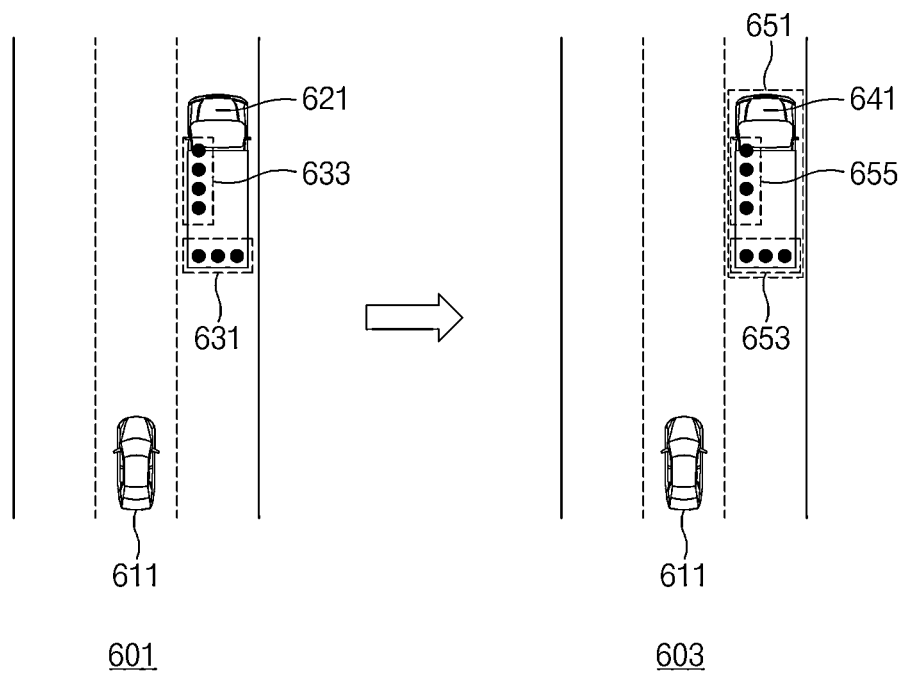
FIG. 6 shows an example of merging virtual boxes corresponding to an external vehicle, in an example of the present disclosure.

FIG. 6 shows an example of merging virtual boxes corresponding to an external object (e.g., vehicle), in an example of the present disclosure.

Referring to FIG. 6, a vehicle control apparatus according to an example may be included in a vehicle 611.

Referring to a first example 601 in FIG. 6, a processor of a vehicle control apparatus according to an example may identify a first lane where the vehicle 611 is driving. The processor may identify a second lane adjacent to the first lane on which the vehicle 611 is driving. For example, the second lane may be may include a lane located to a left side of the first lane, or a right side of the first lane. Hereinafter, an example of merging a virtual box corresponding to an external vehicle identified on the second lane with a virtual box identified within a designated distance from the virtual box corresponding to the external vehicle is described. However, an example is not limited to the above-described example. For example, the processor may merge a virtual box corresponding to an external vehicle, which is identified on the first lane, with a virtual box identified within a designated distance from the virtual box corresponding to the external vehicle.

In an example, the processor may identify a virtual box 631 corresponding to an external vehicle 621 on the second lane. For example, the virtual box 631 may include a virtual box, which has an assigned identifier and which is tracked during frames of a designated section.

In an example, the processor may identify the virtual box 631 corresponding to the external vehicle 621 and a virtual box 633 in a stationary state. In an example, the processor may merge the virtual box 631 corresponding to the external vehicle 621, and the virtual box 633 of the stationary state detected within a designated distance from the virtual box 631, based on the fact that the external vehicle 621 is driving on the first lane, or on the second lane adjacent to the first lane, the external vehicle 621 is a leading vehicle, or a pre-leading vehicle, and is identified as being in a moving state where the external vehicle 621 is driving in a direction in which the vehicle 611 is driving, the type of the virtual box 631 is determined as an unknown vehicle, the external vehicle 621 is not occluded, a longitudinal distance between the vehicle 611 and the external vehicle 621 is within a designated section, and a height of the external vehicle 621 is greater than or equal to a reference height.

For example, the processor may identify a virtual box generated on the first lane. For example, the processor may identify the virtual box generated on the first lane based on the leading vehicle, which is cut out, from among the leading vehicle and the pre-leading vehicle driving on the first lane. For example, the processor may identify the virtual box generated on the first lane based on the pre-leading vehicle, which is cut in to the first lane, from among the leading vehicle and the pre-leading vehicle driving on the second lane.

Referring to a second example 603 in FIG. 6, in an example, the processor may merge a virtual box 653 corresponding to the external vehicle 641, and a virtual box 655 of the stationary state. For example, the processor may obtain a merge box 651 obtained by merging the virtual box 653 corresponding to the external vehicle 641 and the virtual box 655 of the stationary state.

As described above, the processor of the vehicle control apparatus according to an example may merge the virtual boxes 633 and 655 of the stationary state, which cause mis-braking of the vehicle 611, and the virtual boxes 631 and 653 corresponding to the external vehicle 641. The processor may merge the virtual boxes 633 and 655 of the stationary state, which cause mis-braking of the vehicle 611, and the virtual boxes 631 and 653 corresponding to the external vehicle 641, thereby preventing the mis-braking of the vehicle 611.

Figure 7:
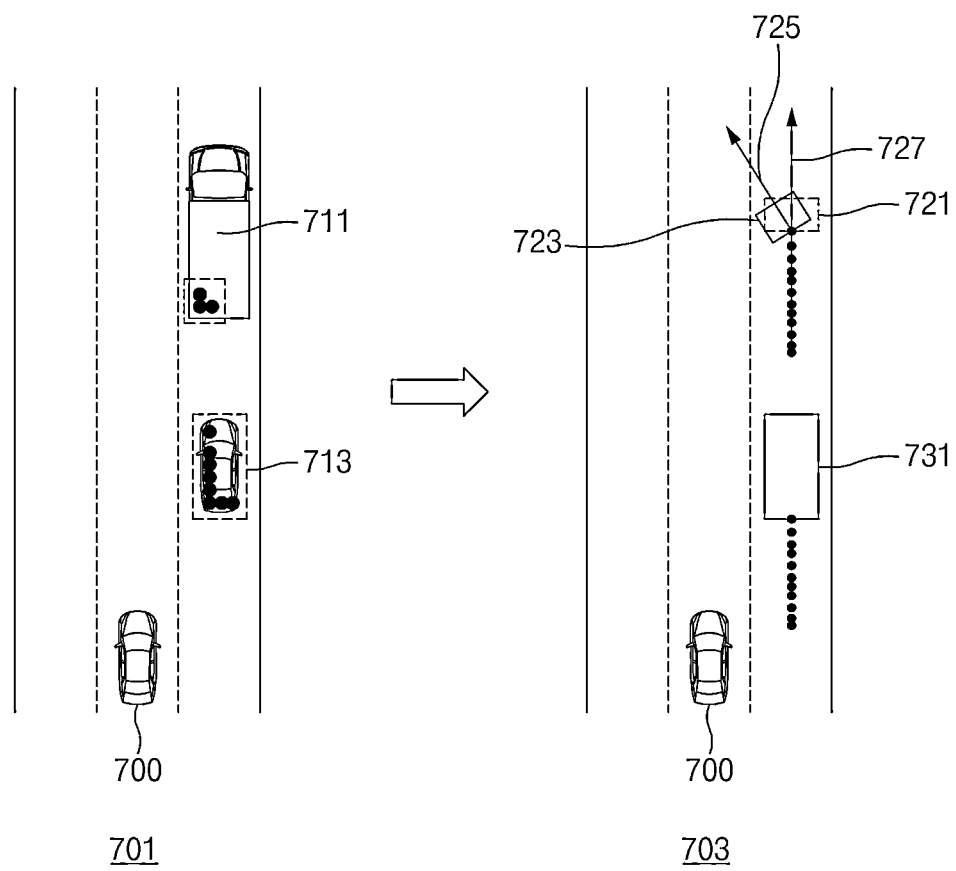
FIG. 7 shows an example of changing a heading direction of a virtual box corresponding to an external vehicle, in an example of the present disclosure.

FIG. 7 shows an example of changing a heading direction of a virtual box corresponding to an external vehicle, in an example of the present disclosure.

Referring to FIG. 7, a vehicle control apparatus according to an example may be included in a vehicle 700.

Referring to a first example 701 in FIG. 7, a processor of a vehicle control apparatus according to an example may detect a first lane where the vehicle 700 is driving. The processor may identify a second lane adjacent to the first lane on which the vehicle 700 is driving.

The processor may identify a first external vehicle 711 and a second external vehicle 713 that are driving on a second lane. The processor may identify that the first external vehicle 711 is occluded by the second external vehicle 713.

Referring to a second example 703 in FIG. 7, in an 731 example, the processor may identify a virtual box corresponding to the second external vehicle 713. The processor may identify a virtual box 723 corresponding to the first external vehicle 711. The processor may change a heading direction 725 of the virtual box 723 corresponding to the first external vehicle 711 based on the fact that the first external vehicle 711 is occluded by the second external vehicle 713, the first external vehicle 711 is identified on the first lane on which the vehicle 700 is driving or the first external vehicle 711 is detected on the second lane adjacent to the first lane where the vehicle 700 is driving, the first external vehicle 711 is a pre-leading vehicle, the first external vehicle 711 is in a moving state in a direction in which the vehicle 700 is driving, and a height of the first external vehicle 711 is greater than or equal to a second reference height (e.g., about 2-3 m).

For example, the processor may store a heading direction of the first external vehicle 711 based on tracking the first external vehicle 711 during frames of a designated section. For example, the processor may store the heading direction of the first external vehicle 711 identified during the frames of the designated section.

For example, the processor may store the heading direction of the first external vehicle 711 in a memory based on a difference between the heading direction of the vehicle 700 and the heading direction of the first external vehicle 711 being smaller than or equal to a reference angle (e.g., approximately 4-6 degrees). For example, the processor may store the heading direction of the first external vehicle 711 in the memory based on a difference between the heading direction of the vehicle 700 and the heading direction of the first external vehicle 711 identified during the frames of the designated section being smaller than or equal to the reference angle.

The processor may obtain an average of the heading direction of the first external vehicle 711 identified during the frames of the designated section. For example, the processor may change the heading direction 725 of the virtual box 723 by using the average of the heading direction of the first external vehicle 711.

In an example, the processor may change the heading direction 725 of the virtual box 723 and may output a virtual box 721 and a heading direction 727. For example, the processor may output the virtual box 721 having the changed heading direction 727. For example, the processor may map the virtual box 721 having the changed heading direction 727 onto the external vehicle 711.

As described above, the processor of the vehicle control apparatus according to an example may prevent mis-braking of the vehicle 700 by mapping the virtual box 721 having the changed heading direction 727 onto the external vehicle 711.

Figure 8:
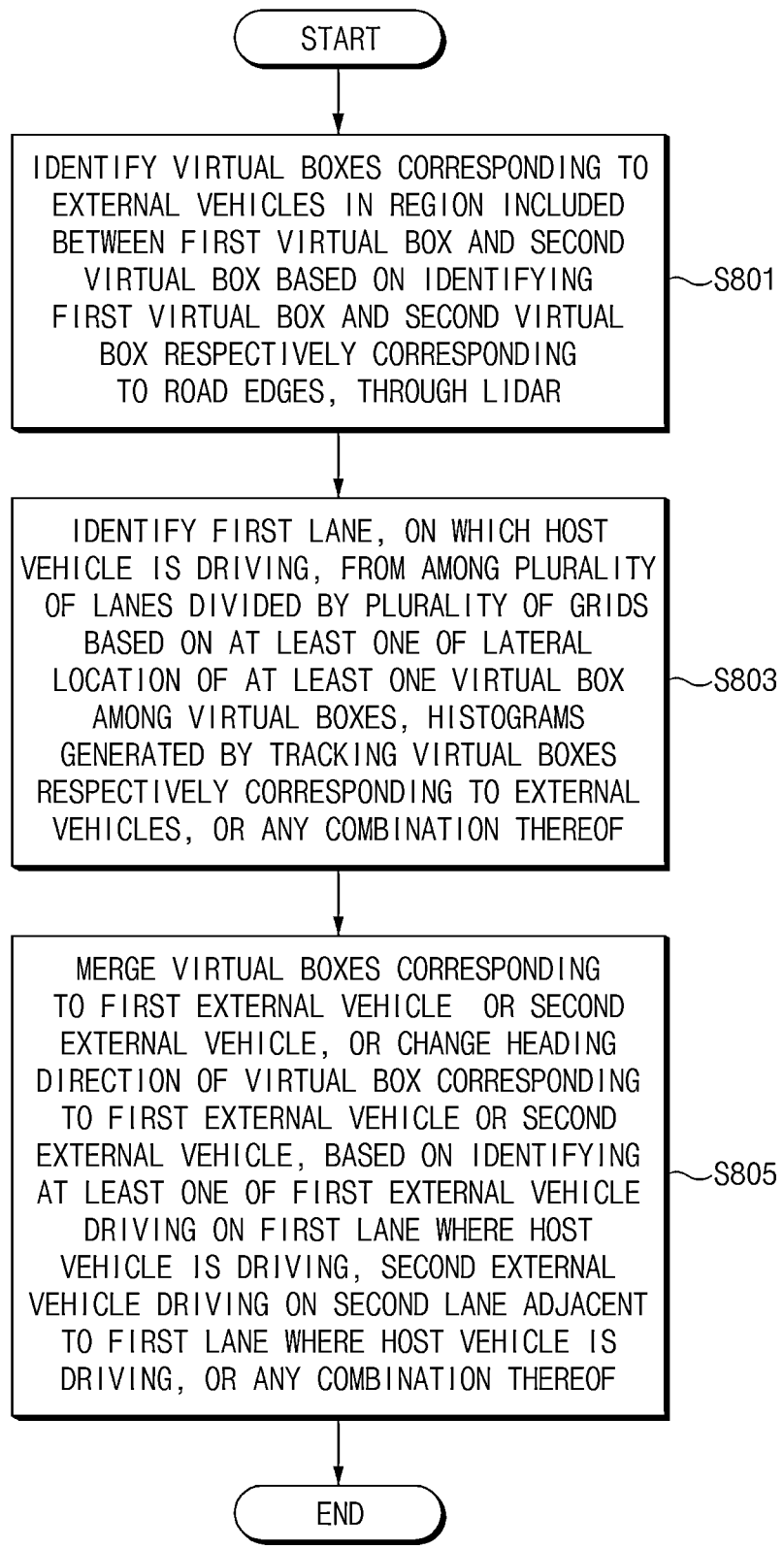
FIG. 8 shows an example of a flowchart related to a vehicle control method, according to an example of the present disclosure.

Hereinafter, a vehicle controlling method according to another example of the present disclosure will be described in detail with reference to FIG. 8. FIG. 8 shows an example of a flowchart related to a vehicle control method, according to an example of the present disclosure.

Hereinafter, it is assumed that the vehicle control apparatus 100 of FIG. 1 performs the process of FIG. 8. In addition or alternative, in a description of FIG. 8, it may be understood that an operation described as being performed by a processor is controlled by the processor 110 of the vehicle control apparatus 100.

At least one of operations of FIG. 8 may be performed by the vehicle control apparatus 100 of FIG. 1. Each of the operations in FIG. 8 may be performed sequentially, but is not necessarily sequentially performed. For example, the order of operations may be changed, and at least two operations may be performed in parallel.

Referring to FIG. 8, in operation S801, a vehicle control method according to an example may include an operation of identifying virtual boxes corresponding to external vehicles in a region included between a first virtual box and a second virtual box based on identifying the first virtual box and the second virtual box respectively corresponding to road edges, through a LiDAR (e.g., the LiDAR 120 of FIG. 1). For example, the region included between the first virtual box and the second virtual box may include a region in which at least one of a vehicle, or an external vehicle, or any combination thereof is capable of driving.

In operation S803, a vehicle control method according to an example may include an operation of identifying a first lane, on which a vehicle is driving, from among a plurality of lanes divided by a plurality of grids based on at least one of a lateral location of at least one virtual box among the virtual boxes, or histograms generated by tracking the virtual boxes respectively corresponding to the external vehicles, or any combination thereof.

For example, the vehicle control method may include identifying the first lane, on which the vehicle is driving, based on the lateral location of the at least one virtual box among the virtual boxes if a longitudinal distance between the vehicle and each of the virtual boxes is smaller than or equal to a first reference distance.

For example, the vehicle control method may include an operation of identifying the first lane, on which the vehicle is driving, based on the histograms generated by tracking the virtual boxes respectively corresponding to the external vehicles if the longitudinal distance between the vehicle and each of the virtual boxes exceeds the first reference distance.

For example, the vehicle control method may include an operation of identifying the lateral location of the at least one virtual box among the virtual boxes based on at least one of a speed of the vehicle, a yaw rate of the vehicle, or an inter-axis distance between front and rear axles of the vehicle, or any combination thereof if the vehicle is driving at a speed in a first range.

For example, the vehicle control method may include an operation of identifying the lateral location of the at least one virtual box among the virtual boxes based on at least one of a speed of the vehicle, or a yaw rate of the vehicle, or any combination thereof if the vehicle is driving at a speed in a second range. The first range and the second range may be different, overlap, or the same. The first range may be higher than the second range.

In operation S805, a vehicle control method according to an example may include an operation of merging virtual boxes corresponding to a first external vehicle or a second external vehicle, or change a heading direction of a virtual box corresponding to the first external vehicle or the second external vehicle, based on identifying at least one of the first external vehicle driving on the first lane where the vehicle is driving, or the second external vehicle driving on a second lane adjacent to the first lane where the vehicle is driving, or any combination thereof.

For example, the vehicle control method may include an operation of identifying at least one of the first external vehicle, or the second external vehicle, or any combination thereof and merging a third virtual box corresponding to the first external vehicle or the second external vehicle with a fourth virtual box identified within the designated distance from the third virtual box based on the fact that the first external vehicle or the second external vehicle is identified as a leading vehicle of the vehicle or a pre-leading vehicle, a first external vehicle or a second external vehicle is driving in a positive direction of the first axis among the first axis, the second axis, and the third axis, a longitudinal distance between the vehicle and the first external vehicle or the second external vehicle is identified as being within a designated section, and a height of the first external vehicle or the second external vehicle is greater than or equal to a first reference height.

For example, the vehicle control method may include an operation of identifying at least one of the first external vehicle, or the second external vehicle, or any combination thereof and changing a heading direction of a virtual box corresponding to the first external vehicle or the second external vehicle based on a fact that the first external vehicle or the second external vehicle is a leading vehicle of the vehicle, the first external vehicle or the second external vehicle is identified as being in a moving state in a positive direction of a first axis, among the first axis, a second axis, and a third axis, and a height of the first external vehicle or the second external vehicle is greater than or equal to a second reference height.

For example, the vehicle control method may include an operation of identifying a first heading direction of the vehicle and a second heading direction of the first external vehicle or the second external vehicle, and changing the second heading direction of the virtual box corresponding to the first external vehicle or the second external vehicle by using an average of heading directions of the first external vehicle or the second external vehicle identified during frames of a designated section based on a fact that a difference between the first heading direction and the second heading direction is smaller than or equal to a reference angle.

For example, the vehicle control method may include an operation of outputting information indicating that at least one external vehicle is driving in a lane, on which a bush object or a road edge is identified, based on identifying the bush object or the road edge on the lane in which the at least one of the external vehicles is driving.

For example, the bush object may include a virtual box including a plurality of irregular points. For example, the bush object may include a virtual box to which an identifier indicating the bush object is assigned.

For example, the vehicle control method may include an operation of sequentially assigning an identifier according to a longitudinal distance to the virtual boxes corresponding to the external vehicles, based on a longitudinal distance between the vehicle and each of the virtual boxes.

For example, the vehicle control method may include an operation of identifying a longitudinal distance between the vehicle and each virtual box by using an identifier sequentially assigned to virtual boxes corresponding to external vehicles.

As described above, the vehicle control method may include an operation of merging virtual boxes corresponding to the first external vehicle or the second external vehicle, or changing a heading direction of a virtual box corresponding to the first external vehicle or the second external vehicle, based on identifying at least one of the first external vehicle, or the second external vehicle, or any combination thereof, thereby providing assistance in driving the vehicle.

Figure 9:
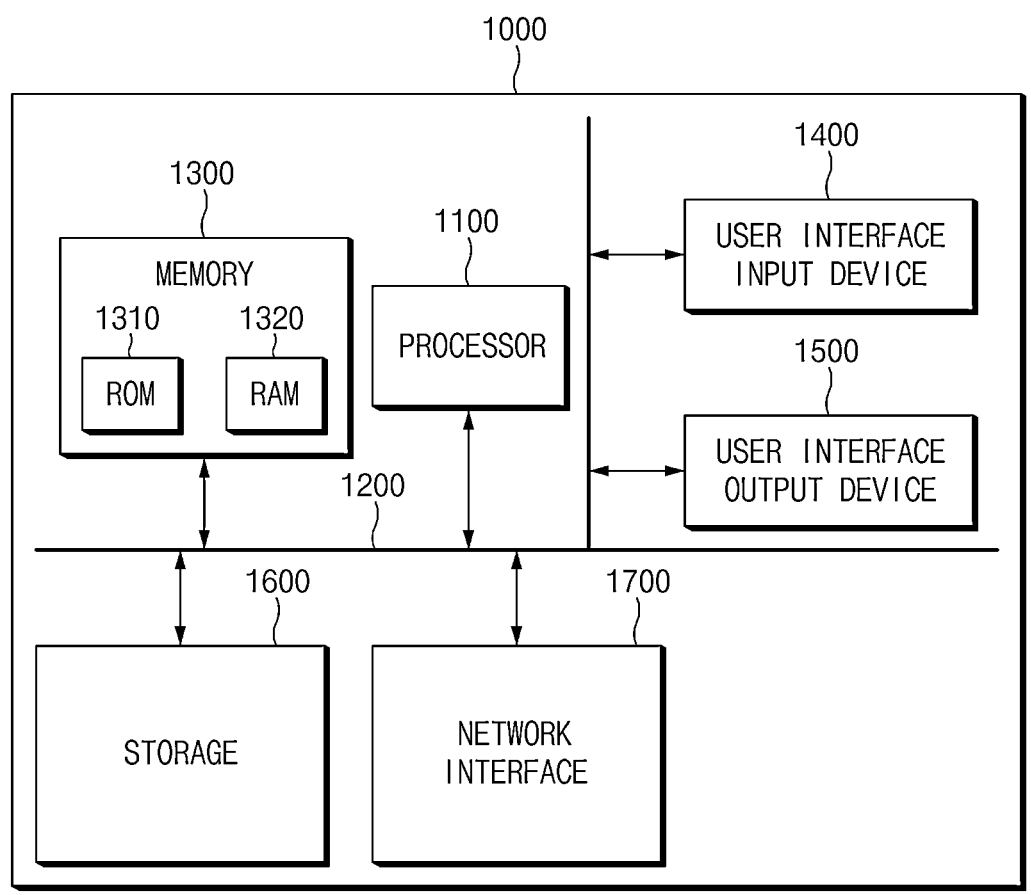
FIG. 9 shows an example of a computing system related to a vehicle control apparatus or vehicle control method, according to an example of the present disclosure.

FIG. 9 shows an example of a computing system related to a vehicle control apparatus or vehicle control method, according to an example of the present disclosure.

Referring to FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the examples disclosed in the specification may be directly implemented with a hardware module, or a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively or additionally, the storage medium may be integrated with the processor 1100. The processor and storage medium may be implemented with an application specific integrated circuit (ASIC). The ASIC may be provided in a user terminal. Alternatively or additionally, the processor and storage medium may be implemented with separate components in the user terminal.

The present disclosure has been made to solve the above-mentioned problems occurring in the prior art while advantages achieved by the prior art are maintained intact.

An example of the present disclosure provides a vehicle control apparatus that identifies a road edge by using a histogram generated based on tracking an external vehicle, and a method thereof.

An example of the present disclosure provides a vehicle control apparatus that provides stable driving of a vehicle by changing a heading direction of a virtual box or merging separate virtual boxes, and a method thereof.

An example of the present disclosure provides a vehicle control apparatus that provides stable driving of the vehicle by identifying the accurate heading direction of an occluded external vehicle even when identifying the occluded external vehicle, and a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a vehicle control apparatus may include a light detection and ranging (LiDAR) and a processor. The processor may identify virtual boxes corresponding to external vehicles in a region included between a first virtual box and a second virtual box based on identifying the first virtual box and the second virtual box respectively corresponding to road edges, through the LiDAR, may identify a first lane, on which a vehicle is driving, from among a plurality of lanes divided by a plurality of grids based on at least one of a lateral location of at least one virtual box among the virtual boxes, or histograms generated by tracking the virtual boxes respectively corresponding to the external vehicles, or any combination thereof, and may merge virtual boxes corresponding to a first external vehicle or a second external vehicle, or change a heading direction of a virtual box corresponding to the first external vehicle or the second external vehicle, based on identifying at least one of the first external vehicle driving on the first lane where the vehicle is driving, or the second external vehicle driving on a second lane adjacent to the first lane where the vehicle is driving, or any combination thereof.

In an example, the processor may identify the first lane, on which the vehicle is driving, based on the lateral location of the at least one virtual box among the virtual boxes if a longitudinal distance between the vehicle and each of the virtual boxes is smaller than or equal to a first reference distance. The longitudinal distance between the vehicle and each of the virtual boxes may include a first straight line parallel to or corresponding to a front surface of the vehicle, and a distance closest to the first straight line from points included in the virtual boxes corresponding to the external vehicles.

In an example, the processor may identify the first lane, on which the vehicle is driving, based on the histograms generated by tracking the virtual boxes respectively corresponding to the external vehicles if a longitudinal distance between the vehicle and each of the virtual boxes exceeds a first reference distance. The longitudinal distance between the vehicle and each of the virtual boxes may include a first straight line parallel to or corresponding to a front surface of the vehicle, and a distance closest to the first straight line from points included in the virtual boxes corresponding to the external vehicles.

In an example, the processor may identify the lateral location of the at least one virtual box among the virtual boxes based on at least one of a speed of the vehicle, a yaw rate of the vehicle, or an inter-axis distance between front and rear axles of the vehicle, or any combination thereof, if the vehicle is driving at a speed in a first range.

In an example, the processor may identify the lateral location of the at least one virtual box among the virtual boxes based on at least one of a speed of the vehicle, or a yaw rate of the vehicle, or any combination thereof, if the vehicle is driving at a speed in a second range.

In an example, the processor may identify at least one of the first external vehicle, or the second external vehicle, or any combination thereof, and may merge a third virtual box corresponding to the first external vehicle or the second external vehicle and a fourth virtual box identified within the designated distance from the third virtual box based on a fact that the first external vehicle or the second external vehicle is identified as a leading vehicle of the vehicle, or a pre-leading vehicle, the first external vehicle or the second external vehicle is identified as being in a moving state in a positive direction of a first axis among the first axis, a second axis, and a third axis, a longitudinal distance between the vehicle and the first external vehicle or the second external vehicle is identified as being within a designated section, and a height of the first external vehicle or the second external vehicle is greater than or equal to a first reference height. The longitudinal distance between the first external vehicle or the second external vehicle and the vehicle may include a first straight line parallel to or corresponding to a front surface of the vehicle, and a distance closest to the first straight line from points included in the third virtual box or the fourth virtual box.

In an example, the processor may identify at least one of the first external vehicle, or the second external vehicle, or any combination thereof, and may change a heading direction of a virtual box corresponding to the first external vehicle or the second external vehicle based on a fact that the first external vehicle or the second external vehicle is a leading vehicle of the vehicle, the first external vehicle or the second external vehicle is identified as being in a moving state in a positive direction of a first axis among the first axis, a second axis, and a third axis, and a height of the first external vehicle or the second external vehicle is greater than or equal to a second reference height.

In an example, the processor may identify a first heading direction of the vehicle and a second heading direction of the first external vehicle or the second external vehicle, and may change the second heading direction of the virtual box corresponding to the first external vehicle or the second external vehicle by using an average of heading directions of the first external vehicle or the second external vehicle identified during frames of a designated section based on a fact that a difference between the first heading direction and the second heading direction is smaller than or equal to a reference angle.

In an example, the processor may output information indicating that at least one external vehicle is driving in a lane, on which a bush object or a road edge is identified, based on identifying the bush object or the road edge on the lane in which the at least one of the external vehicles is driving.

In an example, the processor may sequentially assign an identifier according to a longitudinal distance to the virtual boxes corresponding to the external vehicles, based on a longitudinal distance between the vehicle and each of the virtual boxes. The longitudinal distance between the vehicle and each of the virtual boxes may include a first straight line parallel to or corresponding to a front surface of the vehicle, and a distance closest to the first straight line from points included in the virtual boxes corresponding to the external vehicles.

According to an example of the present disclosure, a vehicle control method may include identifying virtual boxes corresponding to external vehicles in a region included between virtual box and a second virtual box based on a first identifying the first virtual box and the second virtual box respectively corresponding to road edges, through a LiDAR, identifying a first lane, on which a vehicle is driving, from among a plurality of lanes divided by a plurality of grids based on at least one of a lateral location of at least one virtual box among the virtual boxes, or histograms generated by tracking the virtual boxes respectively corresponding to the external vehicles, or any combination thereof, and merging virtual boxes corresponding to a first external vehicle or a second external vehicle, or change a heading direction of a virtual box corresponding to the first external vehicle or the second external vehicle, based on identifying at least one of the first external vehicle driving on the first lane where the vehicle is driving, or the second external vehicle driving on a second lane adjacent to the first lane where the vehicle is driving, or any combination thereof.

According to an example, the vehicle control method may further include identifying the first lane, on which the vehicle is driving, based on the lateral location of the at least one virtual box among the virtual boxes if a longitudinal distance between the vehicle and each of the virtual boxes is smaller than or equal to a first reference distance. The longitudinal distance between the vehicle and each of the virtual boxes may include a first straight line parallel to or corresponding to a front surface of the vehicle, and a distance closest to the first straight line from points included in the virtual boxes corresponding to the external vehicles.

According to an example, the vehicle control method may further include identifying the first lane, on which the vehicle is driving, based on the histograms generated by tracking the virtual boxes respectively corresponding to the external vehicles if a longitudinal distance between the vehicle and each of the virtual boxes exceeds a first reference distance. The longitudinal distance between the vehicle and each of the virtual boxes may include a first straight line parallel to or corresponding to a front surface of the vehicle, and a distance closest to the first straight line from points included in the virtual boxes corresponding to the external vehicles.

According to an example, the vehicle control method may further include identifying the lateral location of the at least one virtual box among the virtual boxes based on at least one of a speed of the vehicle, a yaw rate of the vehicle, or an inter-axis distance between front and rear axles of the vehicle, or any combination thereof, if the vehicle is driving at a speed in a first range.

According to an example, the vehicle control method may further include identifying the lateral location of the at least one virtual box among the virtual boxes based on at least one of a speed of the vehicle, or a yaw rate of the vehicle, or any combination thereof, if the vehicle is driving at a speed in a second range.

According to an example, the vehicle control method may further include identifying at least one of the first external vehicle, or the second external vehicle, or any combination thereof, and merging a third virtual box corresponding to the first external vehicle or the second external vehicle and a fourth virtual box identified within the designated distance from the third virtual box based on a fact that the first external vehicle or the second external vehicle is identified as a leading vehicle of the vehicle or a pre-leading vehicle, the first external vehicle or the second external vehicle is identified as being in a moving state in a positive direction of a first axis, among the first axis, a second axis, and a third axis, a longitudinal distance between the vehicle and the first external vehicle or the second external vehicle is identified as being within a designated section, a height of the first external vehicle or the second external vehicle is greater than or equal to a first reference height. The longitudinal distance between the first external vehicle or the second external vehicle and the vehicle may include a first straight line parallel to or corresponding to a front surface of the vehicle, and a distance closest to the first straight line from points included in the third virtual box or the fourth virtual box.

According to an example, the vehicle control method may further include identifying at least one of the first external vehicle, or the second external vehicle, or any combination thereof, and changing a heading direction of a virtual box corresponding to the first external vehicle or the second external vehicle based on a fact that the first external vehicle or the second external vehicle is a leading vehicle of the vehicle, the first external vehicle or the second external vehicle is identified as being in a moving state in a positive direction of a first axis, among the first axis, a second axis, and a third axis, and a height of the first external vehicle or the second external vehicle is greater than or equal to a second reference height.

According to an example, the vehicle control method may further include identifying a first heading direction of the vehicle and a second heading direction of the first external vehicle or the second external vehicle, and changing the second heading direction of the virtual box corresponding to the first external vehicle or the second external vehicle by using an average of heading directions of the first external vehicle or the second external vehicle identified during frames of a designated section based on a fact that a difference between the first heading direction and the second heading direction is smaller than or equal to a reference angle.

According to an example, the vehicle control method may further include outputting information indicating that at least one external vehicle is driving in a lane, on which a bush object or a road edge is identified, based on identifying the bush object or the road edge on the lane in which the at least one of the external vehicles is driving.

According to an example, the vehicle control method may further include sequentially assigning an identifier according to a longitudinal distance to the virtual boxes corresponding to the external vehicles, based on a longitudinal distance between the vehicle and each of the virtual boxes. The longitudinal distance between the vehicle and each of the virtual boxes may include a first straight line parallel to or corresponding to a front surface of the vehicle, and a distance closest to the first straight line from points included in the virtual boxes corresponding to the external vehicles.

The above description is merely an example of the technical idea of the present disclosure, and various modifications and modifications may be made by one skilled in the art without departing from the essential characteristic of the present disclosure.

Accordingly, examples of the present disclosure are intended not to limit but to explain the technical idea of the present disclosure, and the scope and spirit of the present disclosure is not limited by the above examples. The scope of protection of the present disclosure should be construed by the attached claims, and all equivalents thereof should be construed as being included within the scope of the present disclosure.

The present technology may identify a road edge by using a histogram generated based on tracking an external vehicle.

Moreover, the present technology may provide stable driving of a vehicle by changing a heading direction of a virtual box or merging separate virtual boxes.

Furthermore, the present technology may provide stable driving of the vehicle by identifying the accurate heading direction of an occluded external vehicle even when identifying the occluded external vehicle.

Besides, a variety of effects directly or indirectly understood through the specification may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:
a sensor; and
a processor,
wherein the processor is configured to:
determine, based on sensing information obtained by the sensor, virtual boxes corresponding to external vehicles in a region included between a first virtual box and a second virtual box based on determining that the first virtual box and the second virtual box respectively correspond to road edges;

determine a first lane, where a vehicle is driving, among a plurality of lanes divided by a plurality of grids, wherein the first lane is determined based on at least one of:
 a lateral location of at least one virtual box among the virtual boxes, or
 histograms generated by tracking the virtual boxes respectively corresponding to the external vehicles;
merge virtual boxes corresponding to a first external vehicle or a second external vehicle, or change a heading direction of a virtual box corresponding to the first external vehicle or the second external vehicle, based on determining at least one of:
the first external vehicle driving on the first lane where the vehicle is driving, or
the second external vehicle driving on a second lane adjacent to the first lane where the vehicle is driving; and
output a signal indicating the merged virtual boxes or the changed heading direction of the virtual box.

2. The apparatus of claim 1, wherein the processor is configured to:
 determine the first lane, where the vehicle is driving, based on:
  the lateral location of the at least one virtual box among the virtual boxes and
  a longitudinal distance between the vehicle and one of the virtual boxes being smaller than or equal to a first reference distance, and
  wherein the longitudinal distance is a shortest longitudinal distance among a plurality of longitudinal distances, wherein each of the plurality of longitudinal distances is a longitudinal distance between a straight line parallel to or corresponding to a front surface of the vehicle and one of points included in the one of the virtual boxes.

3. The apparatus of claim 1, wherein the processor is configured to:
 determine the first lane, where the vehicle is driving, based on:
  the histograms generated by tracking the virtual boxes and
  a longitudinal distance between the vehicle and one of the virtual boxes exceeding a first reference distance, and
  wherein the longitudinal distance is a shortest longitudinal distance among a plurality of longitudinal distances, wherein each of the plurality of longitudinal distances is a longitudinal distance between a straight line parallel to or corresponding to a front surface of the vehicle and one of points included in the one of the virtual boxes.

4. The apparatus of claim 1, wherein the processor is configured to:
 determine the lateral location of the at least one virtual box among the virtual boxes based on the vehicle driving at a speed in a first range and at least one of:
  a yaw rate of the vehicle, or
  an inter-axis distance between front and rear axles of the vehicle.

5. The apparatus of claim 1, wherein the processor is configured to:
 determine the lateral location of the at least one virtual box among the virtual boxes based on the vehicle driving at a speed in a second range and a yaw rate of the vehicle.

6. The apparatus of claim 1, wherein the processor is configured to:
 determine at least one of the first external vehicle or the second external vehicle; and
 merge a third virtual box corresponding to the first external vehicle or the second external vehicle and a fourth virtual box detected within a designated distance from the third virtual box based on:
  the first external vehicle or the second external vehicle being a leading vehicle of the vehicle, or a pre-leading vehicle,
  the first external vehicle or the second external vehicle being in a moving state,
  a longitudinal distance between the vehicle and the first external vehicle or the second external vehicle being within a designated section, and
  a height of the first external vehicle or the second external vehicle being greater than or equal to a first reference height, and
 wherein the longitudinal distance, between the first external vehicle and the vehicle or between the second external vehicle and the vehicle, is a shortest longitudinal distance among a plurality of longitudinal distances, wherein each of the plurality of longitudinal distances is a longitudinal distance between a straight line parallel to or corresponding to a front surface of the vehicle and one of points included in the third virtual box or the fourth virtual box.

7. The apparatus of claim 1, wherein the processor is configured to:
 select at least one of the first external vehicle or the second external vehicle; and
 change a heading direction of a virtual box corresponding to the first external vehicle or the second external vehicle based on:
  the first external vehicle or the second external vehicle being a leading vehicle of the vehicle,
  the first external vehicle or the second external vehicle being in a moving state, and
  a height of the first external vehicle or the second external vehicle being greater than or equal to a second reference height.

8. The apparatus of claim 7, wherein the processor is configured to:
 determine:
  a first heading direction of the vehicle; and
  a second heading direction of the first external vehicle or the second external vehicle; and
 change the second heading direction by using an average of heading directions of the first external vehicle or the second external vehicle determined during frames of a designated section based on a difference between the first heading direction and the second heading direction being smaller than or equal to a reference angle.

9. The apparatus of claim 1, wherein the processor is configured to:
 output information indicating that at least one the external vehicles is driving in a lane where a bush object or a road edge is detected.

10. The apparatus of claim 1, wherein the processor is configured to:
 sequentially identifier associated with a longitudinal distance to a respective virtual box, based on a plurality of longitudinal distances, wherein each of the plurality of longitudinal distances is a longitudinal distance between the vehicle and the respective virtual box of the virtual boxes, and wherein the longitudinal distance between the vehicle and the respective virtual box is a shortest longitudinal distance between a straight line parallel to or corresponding to a front surface of the vehicle and one of points included in the respective virtual box.

11. A method performed by a processor, the method comprising:
  determining, based on sensing information obtained by the sensor, virtual boxes corresponding to external vehicles in a region included between a first virtual box and a second virtual box based on determining that the first virtual box and the second virtual box respectively correspond to road edges;
  determining a first lane where a vehicle is driving, among a plurality of lanes divided by a plurality of grids, wherein the first lane is determined based on at least one of:
  a lateral location of at least one virtual box among the virtual boxes, or
  histograms generated by tracking the virtual boxes respectively corresponding to the external vehicles;
  merging virtual boxes corresponding to a first external vehicle or a second external vehicle, or change a heading direction of a virtual box corresponding to the first external vehicle or the second external vehicle, based on determining at least one of:
  the first external vehicle driving on the first lane where the vehicle is driving, or
  the second external vehicle driving on a second lane adjacent to the first lane where the vehicle is driving; and
  output a signal indicating the merged virtual boxes or the changed heading direction of the virtual box.

12. The method of claim 11, further comprising:
  determining the first lane, where the vehicle is driving, based on:
  the lateral location of the at least one virtual box among the virtual boxes and
  a longitudinal distance between the vehicle and one of the virtual boxes being smaller than or equal to a first reference distance, and
  wherein the longitudinal distance is a shortest longitudinal distance among a plurality of longitudinal distances, wherein each of the longitudinal distances is a longitudinal distance between a straight line parallel to or corresponding to a front surface of the vehicle and one of points included in the one of the virtual boxes.

13. The method of claim 11, further comprising:
  determining the first lane, where the vehicle is driving, based on:
  the histograms generated by tracking the virtual boxes and
  a longitudinal distance between the vehicle and one of the virtual boxes exceeding a first reference distance, and
  wherein the longitudinal distance s a shortest longitudinal distance among a plurality of longitudinal distances, wherein each of the plurality of longitudinal distances is a longitudinal distance between a straight line parallel to or corresponding to a front surface of the vehicle and one of points included in the one of the virtual boxes.

14. The method of claim 11, further comprising:
  determining the lateral location of the at least one virtual box among the virtual boxes based on the vehicle driving at a speed in a first range and at least one of:
  a yaw rate of the vehicle, or
  an inter-axis distance between front and rear axles of the vehicle.

15. The method of claim 11, further comprising:
  determining the lateral location of the at least one virtual box among the virtual boxes based on the vehicle driving at a speed in a second range and a yaw rate of the vehicle.

16. The method of claim 11, further comprising:
  determining at least one of the first external vehicle or the second external vehicle; and
  merging a third virtual box corresponding to the first external vehicle or the second external vehicle and a fourth virtual box detected within a designated distance from the third virtual box based on:
  the first external vehicle or the second external vehicle being a leading vehicle of the vehicle, or a pre-leading vehicle,
  the first external vehicle or the second external vehicle being in a moving state,
  a longitudinal distance between the vehicle and the first external vehicle or the second external vehicle being within a designated section,
  a height of the first external vehicle or the second external vehicle being greater than or equal to a first reference height, and
  wherein the longitudinal distance, between the first external vehicle and the vehicle or between the second external vehicle and the vehicle, is a shortest longitudinal distance among a plurality of longitudinal distances, wherein each of the plurality of longitudinal distances is a longitudinal distance between a straight line parallel to or corresponding to a front surface of the vehicle and one of points included in the third virtual box or the fourth virtual box.

17. The method of claim 11, further comprising:
  selecting at least one of the first external vehicle or the second external vehicle; and
  changing a heading direction of a virtual box corresponding to the first external vehicle or the second external vehicle based on:
  the first external vehicle or the second external vehicle being a leading vehicle of the vehicle,
  the first external vehicle or the second external vehicle being in a moving state, and
  a height of the first external vehicle or the second external vehicle being greater than or equal to a second reference height.

18. The method of claim 17, further comprising:
  determining:
  a first heading direction of the vehicle; and
  a second heading direction of the first external vehicle or the second external vehicle; and
  changing the second heading direction by using an average of heading directions of the first external vehicle or the second external vehicle determined during frames of a designated section based on a difference between the first heading direction and the second heading direction being smaller than or equal to a reference angle.

19. The method of claim 11, further comprising:
  outputting information indicating that at least one of the external vehicles is driving in a lane where a bush object or a road edge is detected.

20. The method of claim 11, further comprising:
  sequentially assigning an identifier associated with a longitudinal distance to a respective virtual box, based on a plurality of longitudinal distances, wherein each of the plurality of longitudinal distances is a longitudinal distance between the vehicle and the respective virtual box of the virtual boxes, and wherein the longitudinal distance between the vehicle and the respective virtual box is a shortest longitudinal distance between a straight line parallel to or corresponding to a front surface of the vehicle and one of points included in the respective virtual box.

\* \* \* \* \*